(12) United States Patent
Baron

(10) Patent No.: US 8,196,910 B2
(45) Date of Patent: Jun. 12, 2012

(54) PLATFORM ISOLATOR

(75) Inventor: James A. Baron, Hilliard, OH (US)

(73) Assignee: Seicon Limited, Columbus, OH (US)

( * ) Notice: Subject to any disclaimer, the term of this patent is extended or adjusted under 35 U.S.C. 154(b) by 1065 days.

(21) Appl. No.: 12/077,065

(22) Filed: Mar. 13, 2008

(65) Prior Publication Data

US 2008/0224020 A1    Sep. 18, 2008

Related U.S. Application Data

(60) Provisional application No. 60/906,668, filed on Mar. 13, 2007.

(51) Int. Cl.
*F16M 1/00* (2006.01)

(52) U.S. Cl. .................. 267/136; 267/140.14; 248/636; 248/678

(58) Field of Classification Search .................. 267/136, 267/140.11, 140.14; 248/560, 603, 604, 248/614, 615, 634, 636, 637, 638, 646, 678
See application file for complete search history.

(56) References Cited

U.S. PATENT DOCUMENTS

| 5,538,373 | A | * | 7/1996 | Kirkham | 409/131 |
|---|---|---|---|---|---|
| 5,657,649 | A | * | 8/1997 | Lim | 68/23.3 |
| 6,029,959 | A | * | 2/2000 | Gran et al. | 267/136 |
| 6,626,411 | B2 | * | 9/2003 | Houghton et al. | 248/550 |
| 6,911,117 | B1 | * | 6/2005 | Karhunen et al. | 162/199 |
| 7,097,146 | B2 | * | 8/2006 | Tsai | 248/679 |
| 2002/0104950 | A1 | * | 8/2002 | Mayama | 248/638 |

* cited by examiner

*Primary Examiner* — Pamela Rodriguez

(74) *Attorney, Agent, or Firm* — Porter, Wright, Morris & Arthur, LLP

(57) ABSTRACT

The platform isolator of the present invention isolates a vibration source from its surroundings. The platform is supported on elongated members that in turn are supported on knife-edge supports. The ends of the elongated members are restrained from longitudinal movement. The distance between a pair of knife edge supports may be fixed or adjustable based on the expected vibration frequency.

20 Claims, 5 Drawing Sheets

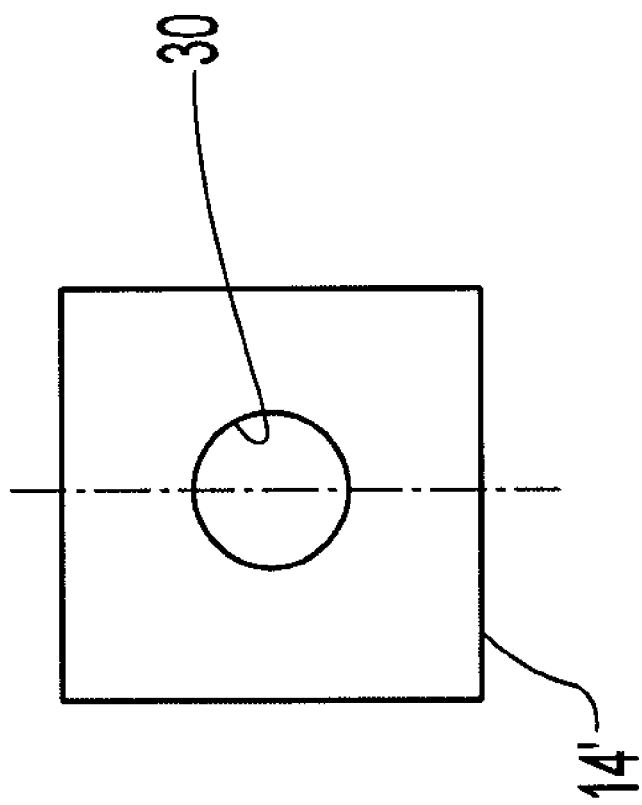
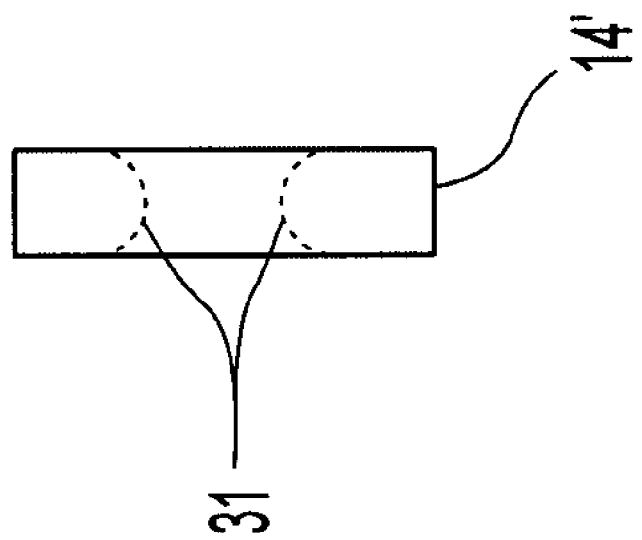
Fig. 8B
Fig. 8A

PLATFORM ISOLATOR

CROSS-REFERENCE TO RELATED APPLICATIONS

This application claims the benefit of U.S. provisional patent application No. 60/906,668, filed Mar. 13, 2007, the content of which is incorporated herein by reference.

STATEMENT REGARDING FEDERALLY SPONSORED RESEARCH

Not applicable

REFERENCE TO MICROFICHE APPENDIX

Not applicable

FIELD OF THE INVENTION

This invention relates to structures that support and isolate vibration originating from an object that is placed on the structure, and particularly platforms that support and isolate vibration from machines for industrial or consumer use including but not limited to automatic washing machines.

BACKGROUND OF THE INVENTION

Washing machines, air conditioners, and other machines frequently cause noise and/or vibration during operation. Conventional washing machines, for example, employ dampers between the vibrating drum and the frame. Some of the vibrational energy is lost as heat while the rest is transmitted to the frame. User response to this transmitted vibration or noise may range from minor annoyance to major aggravation.

Noise and vibration problems may be exacerbated when the machines are placed in locations close to living or sleeping areas; noise or vibration from a first floor laundry room is more likely to disrupt conversations, television watching, or the like in other first floor rooms than noise or vibration from a basement laundry room. Similarly, noise from or vibration from a second floor laundry room is more likely to disrupt sleep than noise from a laundry room located on a different level. Noise and vibration problems also may originate from machines operated by others when individuals work or reside in close proximity to others, as is frequently the case in urban environments and attached residences.

Noise and vibration problems also may be exacerbated when machines are installed in locations that tend to transmit rather than disperse vibration. Washing machines on upper building floors (i.e., not on a basement or slab floor) may readily transit noise and vibration throughout the building. Air conditioners installed on platforms extending from the wall of the building rather than on a concrete pad may also transmit noise and vibration.

Excessive vibration also may cause disruption or damage in addition to adversely affecting user comfort, particularly with machines that include rotating shafts. Excessive vibration also may result in movement of the machine relative to the support surface, which in turn may cause problems including disruption of machine operation or physical damage. Movement of the machine relative to its support can disrupt machine operation, mark or tear finished flooring, or cause water damage if a water supply hose is damaged or disconnected. The forces associated with rotating shafts also may cause damaging movement or vibration of the machine structures that support the shafts and retain them in position.

Manufacturers of machines such as washers and air conditioners have endeavored to produce quieter units but have not consistently achieved success. Machines that exhibit satisfactory performance in an idealized test situation may nevertheless cause undesirable noise and vibration if they are located in an environment that does not allow the vibration to dissipate. Traditional damping methods such as placement of elastomeric or similar pads under the machine also have had only limited success.

Although various solutions to this problem have been proposed, none to date have provided a reliable and inexpensive solution. A need exists for an apparatus that effectively isolates vibration at all stages of operation, allows movement of the appliance from one location to another if desired, is usable with a wide range of appliance brands and models, and is inexpensive. Preferably the apparatus would be usable with successive appliances, although it also may be possible to incorporate the apparatus into the appliance.

SUMMARY OF THE INVENTION

The present invention provides a platform for supporting an object that may vibrate continuously or intermittently and isolating that vibration from the surface on which the platform is placed. The platform isolator includes elongated members, each supported at its ends by two supports, preferably knife-edge support isolator (KESI) units. The elongated members are restrained from longitudinal motion. A central mount 20 on the elongated member between the two supports carries the platform or other load.

A preferred embodiment of the isolator comprises n elongated members wherein n≧3. Each of the elongated members has opposing ends and a central portion intermediate the ends. Knife-edge supports engage each of the n elongated members at a position spaced inwardly from each end. The ends are restrained from longitudinal movement. A mount 20 for supporting a vibration source is connected to the central portion of each of the n elongated members. The knife-edge supports may be arranged such that each of the n elongated members is supported in substantially the same horizontal plane.

The knife-edge supports may be selected from spherical-joint rod ends, spherical joint bearings, and other suitable supports including radius bore supports. The isolator also may comprise a connector selected from a spherical-joint rod end, a spherical joint bearing, and another suitable support including a radius bore support for connecting the central portion of the elongated member to the mount 20.

The isolator may include preselected positions for fixedly connecting a pair of knife-edge supports, the preselected position determining the frequency response of the elongated member supported on that pair of supports. Alternatively, the isolator may include a mechanism for adjusting the resonant frequency of the isolator. The adjustment mechanism may change the distance between the respective knife-edge supports on which an elongated member is supported. The adjustment mechanism may comprise a continuously adjustable threaded rod that changes the distance between the respective knife-edge supports. The adjustment mechanism also may comprise an automated system for monitoring the vibration frequency, comparing it to a standard value, and changing the distance between the respective knife-edge supports in response to this comparison.

The isolator may include four elongated members arranged at right angles to one another. The isolator also may include a drain pan and/or drain port to handle accidental discharge of liquids from the isolated machinery.

BRIEF DESCRIPTION OF THE DRAWINGS

These and further objects of the invention will become apparent from the following detailed description.

FIGS. 8A and 8B are detail side and front elevation views of a radius bore support.

DETAILED DESCRIPTION OF CERTAIN PREFERRED EMBODIMENTS

Figure 1:
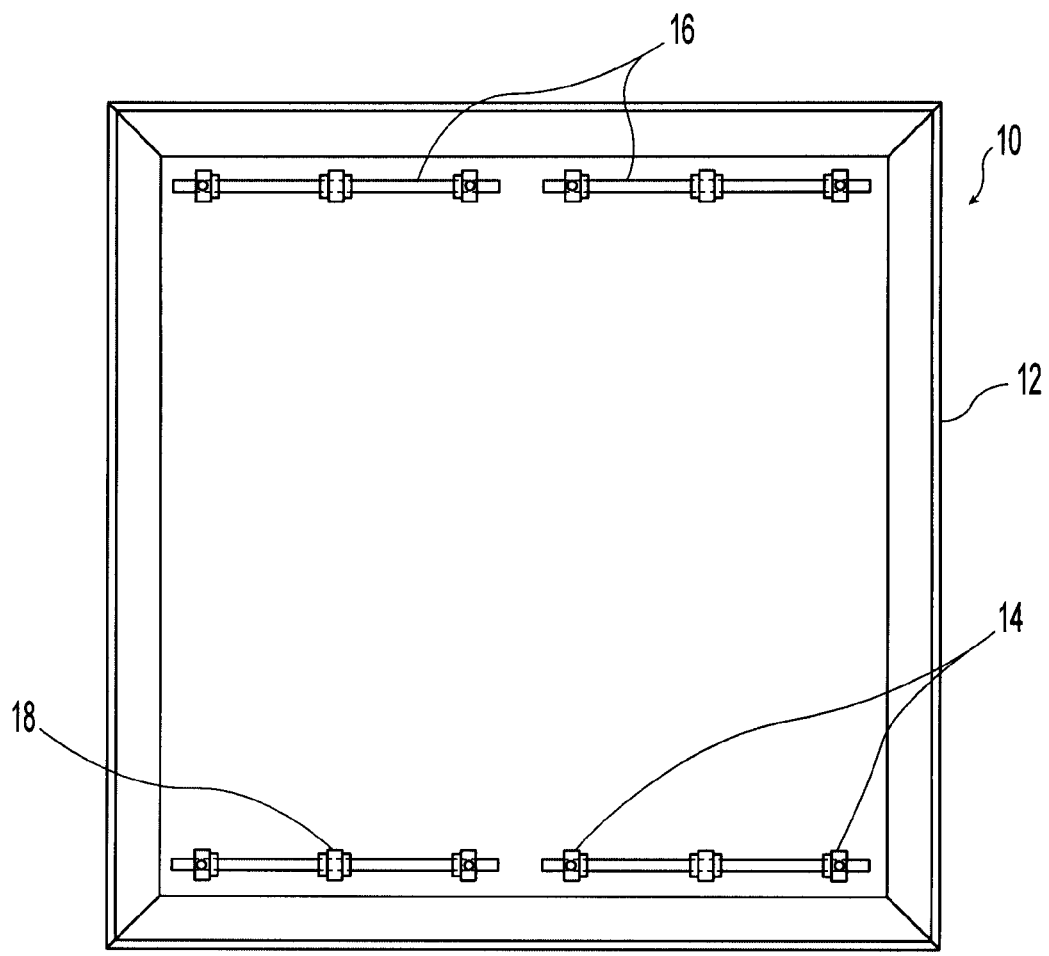
FIG. 1 is a bottom view of an isolator of the present invention.

The platform isolator of the present invention isolates a vibration source from its surroundings. The invention is described herein with particular reference to an article useful in isolating the vibration of a washing machine frame from its surroundings although the utility of the invention is not limited to the particular illustrative embodiment. The platform 12 is supported on elongated members 16 that in turn are supported on knife-edge supports 14. The ends of the elongated members are restrained from longitudinal movement.

For isolators 10 intended for use with a fixed frequency vibration source, the distance between a pair of knife edge supports 14 may be fixed, with the distance being selected that is appropriate for the expected vibration frequency. The distances do not necessarily need to be equal but an equidistant arrangement may improve the performance of the isolator. If desired, the isolator 10 may be constructed such that the surface for supporting the knife-edge supports 14 defines a plurality of bores, with each vibration frequency of a given elongated member 16 changing based on the pair of bores in which its knife-edge supports 14 are installed. This approach will allow a manufacturer or installer to select an appropriate vibration frequency from among designated "pre-sets" to accommodate minor changes in vibration frequency from one brand or model of machine to another.

For isolators 10 intended for use with vibration sources capable of producing a broad spectrum of frequencies, a mechanism may be provided for adjusting the resonant frequency of the isolator. This may be accomplished, for example, by changing the distance between the respective knife-edge supports 14 on which at least one elongated member 16 supported. In one preferred embodiment, the adjustment mechanism may comprise a continuously adjustable threaded rod which changes the distance between a pair of knife-edge supports 14.

In one preferred embodiment, the isolator platform 12 may define the upper surface of an enclosed structure, which may be constructed using conventional methods. The structure also may function as a drain pan 28 to collect liquid such as water or lubricating oil that may be released from or in the vicinity of the machine. A drain port 30 may be provided in the platform 12 to direct the liquid to a desired outlet.

The isolator comprises n elongated member 16, where n≧3. Each of the members 16 has opposing end portions and a central portion intermediate the ends. A plurality of knife-edge supports 14 are provided such that a support 14 engages an end portion of each of the n elongated members 16 and the mount 20 or other load being supported on the central portion of the elongated members 16. In one embodiment, the knife-edge supports 14 may be spherical-joint rod ends, spherical joint bearings, or other suitable supports such a radius bore supports that both engage the ends of the elongated members 16 and limit the movement of the members 16 in a longitudinal direction (i.e., along the long axis of the elongated member 16) Longitudinal motion of the member ends also may be restricted by collars 22 clamped to the elongated members 16.

The elongated members 16 may be rods, shafts, plates, beams, or any other suitable elongated structure. Rods having a circular cross section are believed to yield superior results in some applications but other cross sectional shapes or structural forms may be preferred in other applications. The elongated members may be constructed from any suitable material including but not limited to fiberglass-reinforced epoxy and other composite materials. The configuration and composition of the elongated members may vary with the vibrational frequencies to be isolated and the environmental demands of the location where the isolator is used.

The mount 20 may be supported on the central portion of the elongated members 16 by spherical-joint rod ends, spherical joint bearings, or other suitable knife-edge supports 14. For example, as shown in FIGS. 8A and 8B, the supports may be radius bore supports 14'. A unitary radius bore support may comprise a washer in which the surface of the central bore 30 is fashioned with an internal radius 31 on which an elongated member 16 inserted through the central bore 30 may be supported while allowing the member 16 to slide and pivot relative to the support 14'.

The platform 12 may be constructed from wood, a polymeric material, metal, a composite material, or a combination of these. The platform 12 may define a continuous surface or a web adapted for support on the central portions of the elongated members 16. The size and material of the construction material for the platform are chosen based on the size and weight of the vibration source and the environmental conditions in which the isolator will operate. Other components that, in combination with the platform, define an open- or closed-end enclosure may be constructed from any of the same materials.

The knife-edge supports 14 may be arranged such that the elongated members 16 are positioned to support the size and weight of the platform 12 and the vibration source supported thereon and respond to the expected vibration frequencies of the source. Any configuration of three or more elongated members 16 (other than a collinear three-member arrangement) may be used. The elongated members 16 may be supported in substantially the same horizontal plane or in different horizontal planes.

During operation, the mobility of the vibrating equipment increases as a result of the softness of the isolator 10. If the space around the isolated equipment is confined or the application otherwise does not allow such mobility, the arrangement of the knife-edge supported members 14 may be selected to limit this mobility. Orientation of the elongated members 16 parallel to each other, as shown in FIG. 1, reduces lateral mobility of the isolated equipment in the vertical plane perpendicular to the longitudinal axes of the elongated members 16. Conversely, if no lateral space restrictions exist in the installation, the knife-edge supported members 16 may be arranged in other patterns, for example, at right angles to each other as shown in FIG. 6

Figure 6:
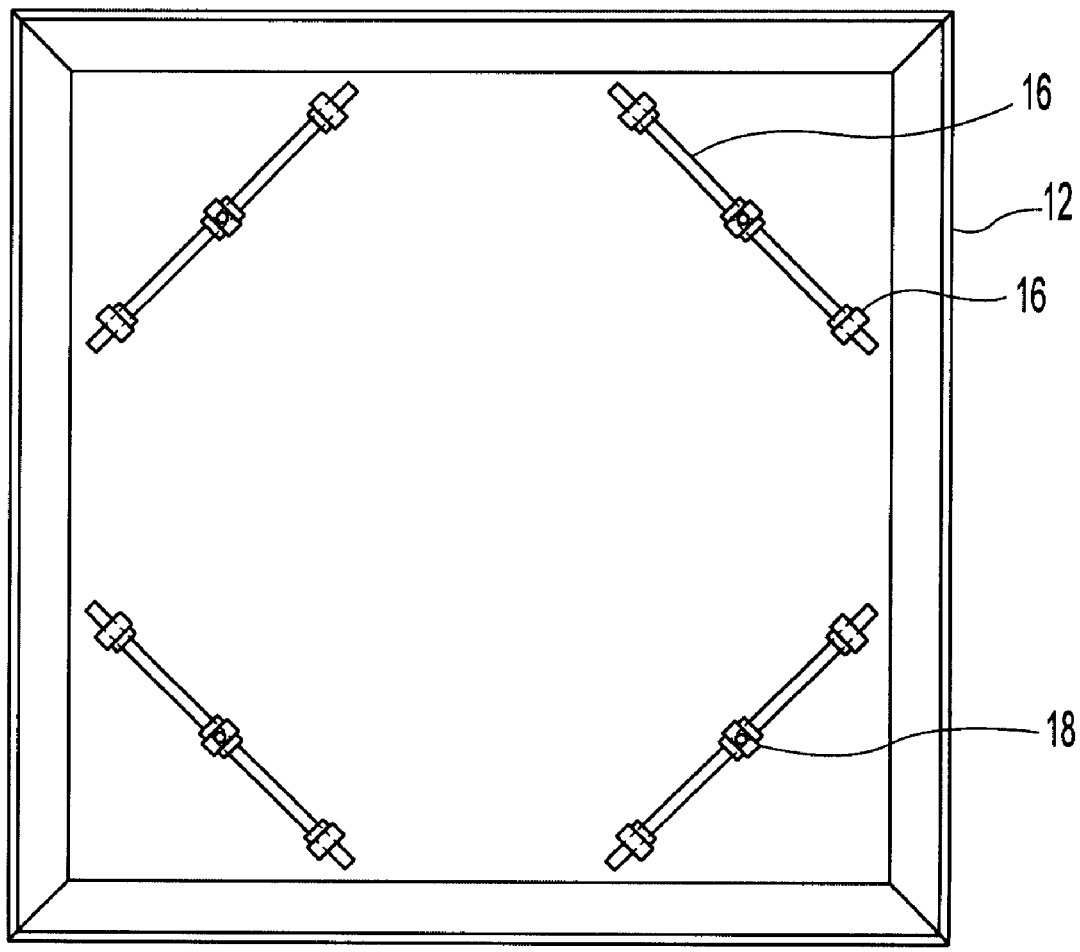
FIG. 6 is a bottom view thereof.

The four-member parallel arrangement shown in FIG. 1 and the four-member angular arrangement shown in FIG. 6 were selected to control the range of rocking motion of a an exemplary vibration source (a washing machine) on the platform 12, but this does not exclude other arrangements for this or other applications. The angular arrangement of the members 16 shown in FIG. 6 is particularly preferred in that maximum isolation is realized in all axes with a small isolator footprint. This arrangement does, however, place the center supports closer to the pivoting center of the platform 12, which allows for more lateral motion of the machine. Supports 14 located in the vicinity of the machine's corners may provide superior results.

Figure 2:
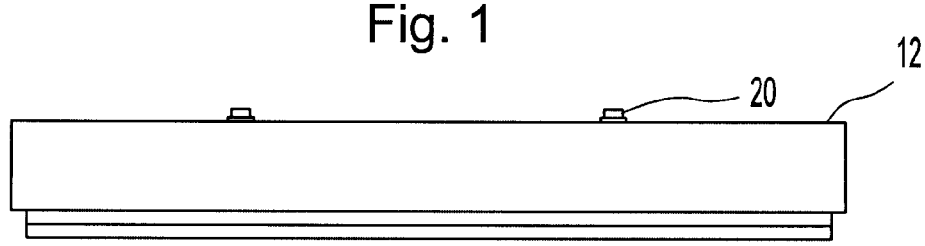
FIG. 2 is a side view thereof.
Figure 3:
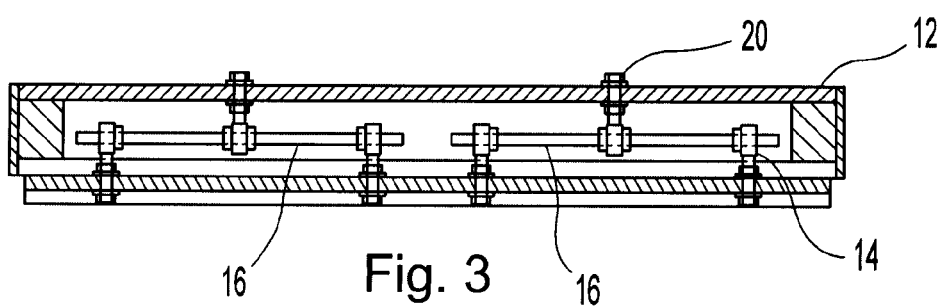
FIG. 3 is a side cross-sectional view thereof
Figure 4:
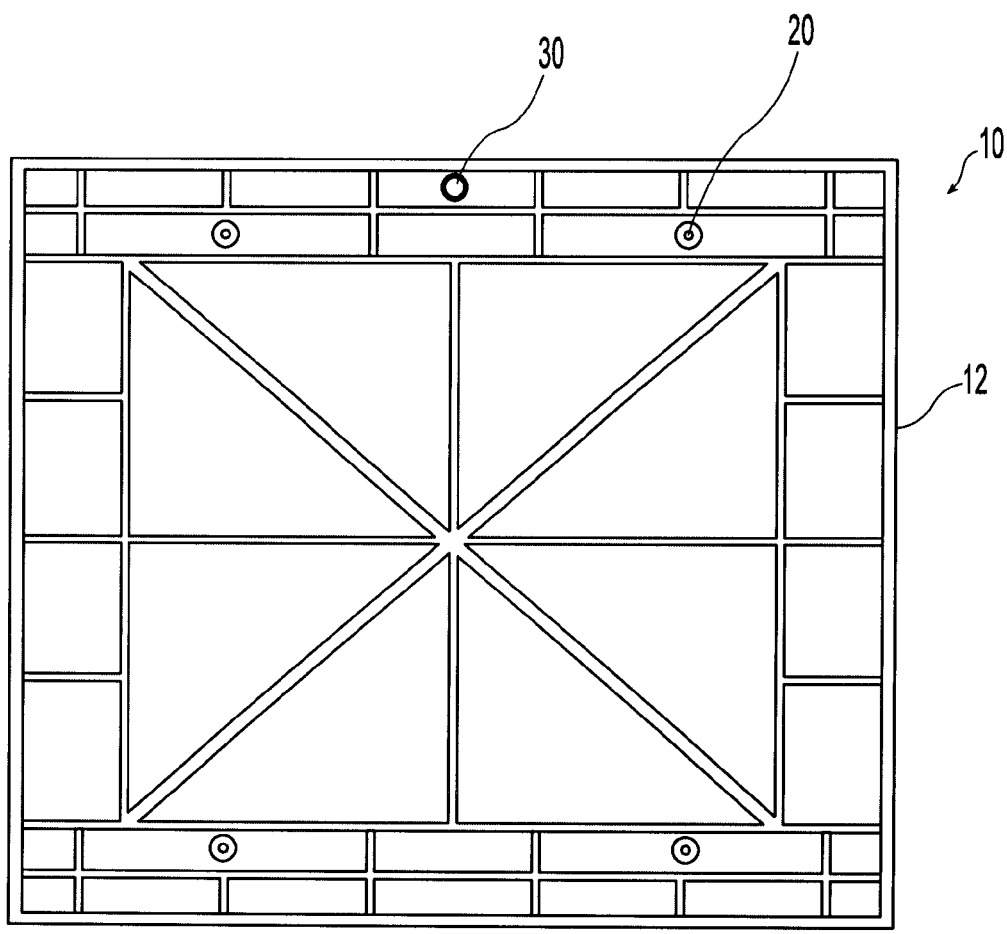
FIG. 4 is a top view of another embodiment of the isolator with an integral drain pan.
Figure 5:
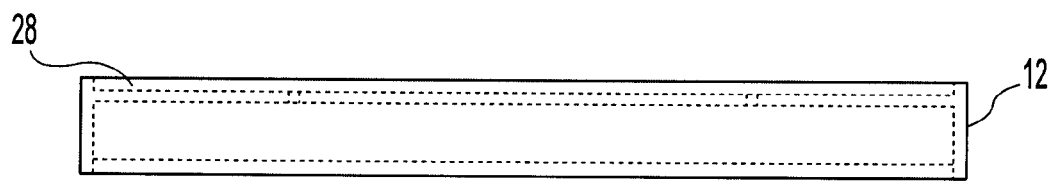
FIG. 5 is a side cross sectional view thereof.

FIGS. 1-3 show an embodiment of the isolator 10 of the present invention having four knife-edge supported members 16 An isolator 10 having an integral drain pan 28 is shown in FIGS. 4-5.

Figure 7:
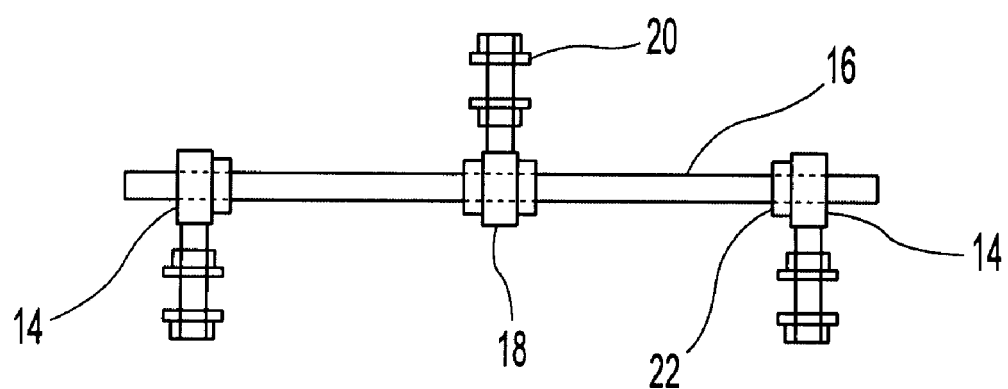
FIG. 7 is a side elevation view of an isolator of the present invention.

FIG. 7 shows a detail view of an exemplary knife-edge supported isolator 10 for a washing machine located within an enclosed base 12. Knife-edge support of the elongated member 16 is provided by three spherical-joint rod ends 14. One rod end, positioned at the central portion of the elongated member 16, is attached to the lower surface of the platform 12 and serves as a connector 18. The two remaining rod ends 14, positioned at the end portions of the elongated member 16, are attached to the base 12. For an enclosure constructed of plywood or a similar material, the rod ends may be anchored into the base material using two nylon lock nuts and two washers as shown, although any suitable fasteners may be used. The knife-edge supports may be anchored directly into the base if the base construction is capable of receiving the supports. Suitable receivers may be provided within a base made of other materials for anchoring the supports when the base material is unable to support direct anchoring.

Figure 9:
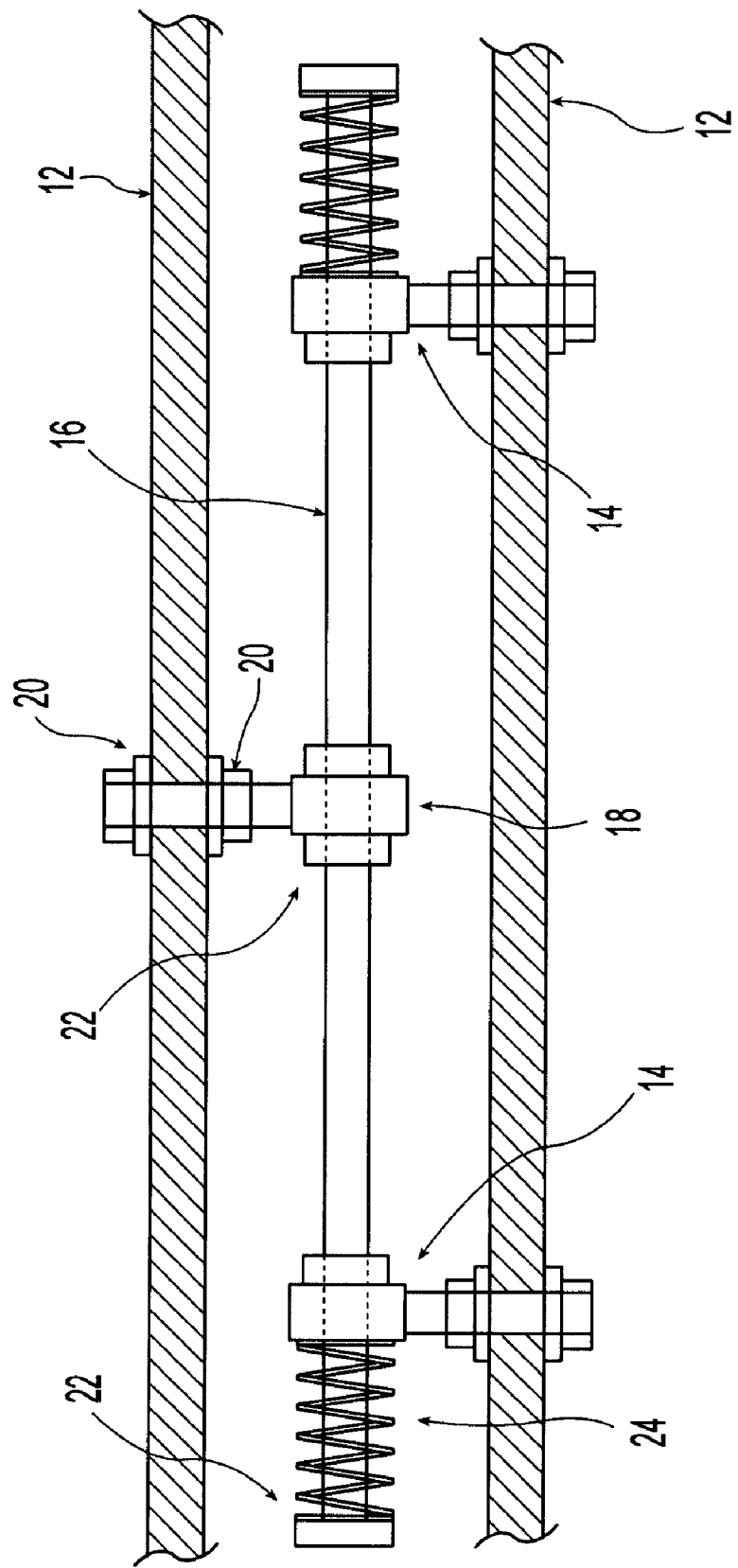
FIG. 9 is a side elevation view of an alternative embodiment of an isolator of the present invention in which springs are used to vary the response of the knife-edge supported elongated members.

If desired, springs may be provided on opposing ends of an elongated member 16 between the support and the corresponding end portions of the member 16, as shown in FIG. 9. This may be accomplished, for example, by providing a spring 24 having one end connected to an end portion of the elongated member 16 or a shaft collar 22 provided on the member 16 and the other spring end connected to the support 14. Compression of the spring increases a vector component of friction on the elongated member 16 and decreases its effective static deflection. Evidence suggests that this may improve system performance through resonance.

It is expected that vibration frequencies for at least some application will be within a narrow enough range that the isolator 10 may be configured to accommodate this range of vibration frequencies without adjustment. If desired, however, the isolator 10 may be tuned to the resonant frequency of interest using an adjustment mechanism. As described above, this may be accomplished by changing the distance between the respective knife-edge supports 14 on which at least one elongated member 16 is supported. In a preferred embodiment, the adjustment mechanism may comprise a continuously adjustable threaded rod which changes the distance between a pair of knife edge supports 14. The isolator 10 may include an automated system that monitors the vibration frequency, compares it to a standard value, and adjusts the distance between the knife edge supports 14.

The preferred embodiment of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention.

What is claimed is:

1. An isolator for a vibration source, comprising:
   a platform having an upper surface for supporting the vibration source thereon;
   a base located below the platform;
   n elongated members wherein n≧3, each of the elongated members having opposing ends and a central portion intermediate the ends;
   a plurality of knife-edge supports secured to the base and engaging and supporting each of the n elongated members at a position spaced inwardly from each member end;
   a plurality of mounts secured to the platform and connected to the central portion of each of the n elongated members so that the elongated members support the platform; and
   wherein mobility of the vibration source increases during operation of the vibration source as a result of softness of the isolator.

2. The isolator of claim 1, wherein the plurality of knife-edge supports is arranged such that each of the n elongated members is supported in substantially the same horizontal plane.

3. The isolator of claim 1, wherein the knife-edge supports are selected from spherical-joint rod ends, spherical joint bearings, and radius bore supports.

4. The isolator of claim 1, wherein the mount includes a connector selected from a spherical-joint rod end, a spherical joint bearing, and a radius bore support for connecting the central portion of an elongated member to the mount.

5. The isolator of claim 1, wherein the isolator defines preselected positions for fixedly connecting a pair of knife-edge supports, the preselected position determining the frequency response of the elongated members supported on that pair of supports.

6. The isolator of claim 1, further comprising:
   a mechanism for adjusting the resonant frequency of the isolator.

7. The isolator of claim 6, wherein the adjustment mechanism changes the distance between a pair of knife-edge supports on which an elongated member is supported.

8. The isolator of claim 7, wherein the adjustment mechanism comprises a continuously adjustable threaded rod that changes the distance between a pair of knife-edge supports on which an elongated member is supported.

9. The isolator of claim 6, wherein the adjustment mechanism comprises an automated system for monitoring the vibration frequency, comparing it to a standard value, and changing the distance between the respective knife-edge supports in response to this comparison.

10. The isolator of claim 1, wherein n=4 and the four elongated members are arranged at right angles to one another.

11. The isolator of claim 1, wherein the isolator includes a drain pan.

12. The isolator of claim 1, further comprising: a spring on each end of at least one of the n elongated members, one spring end being connected to an end portion of the member and the other spring end being connected to the corresponding knife-edge support such that compression of the spring alters the frequency response of the elongated member.

13. The isolator of claim 1, wherein the knife edge supports restrain the elongated members from longitudinal movement.

14. The isolator of claim 1, wherein n=4 and the four elongated members are arranged parallel to one another.

15. The isolator of claim 1, wherein the elongated members comprise a fiber reinforced epoxy.

16. The isolator of claim 1, wherein the mounts permit the elongated members to slide and pivot relative to the mounts.

17. A combination of a vibration source and an isolator for the vibration source, comprising:
   a vibration source;
   an isolator comprising:
   a platform having an upper surface supporting the vibration source thereon;
   a base located below the platform;
   n elongated members wherein n>3, each of the elongated members having opposing ends and a central portion intermediate the ends;
   a plurality of knife-edge supports secured to the base and engaging and supporting each of the n elongated members at a position spaced inwardly from each member end; and
   a plurality of mounts secured to the platform and connected to the central portion of each of the n elongated members so that the elongated members support the platform; and
   wherein mobility of the vibration source increases during operation of the vibration source as a result of softness of the isolator.

18. The isolator of claim 17, wherein the vibration source is washing machine.

19. The isolator of claim 18, wherein n=4 and the four elongated members are arranged parallel to one another.

20. The isolator of claim 17, wherein the mounts permit the elongated members to slide and pivot relative to the mounts.

* * * * *